(12) United States Patent
Buehler et al.

(10) Patent No.: US 8,254,310 B2
(45) Date of Patent: Aug. 28, 2012

(54) AUDIENCE RESPONSE SYSTEM AND METHOD WITH MULTIPLE BASE UNIT CAPABILITY

(75) Inventors: William S. Buehler, Zeeland, MI (US); Raymond E. Baker, Jr., Lower Gwynedd, PA (US); Timothy R. Lambrix, West Olive, MI (US); Michael B. Hall, Holland, MI (US); Troy A. Redder, Grand Haven, MI (US)

(73) Assignee: Fleetwood Group, Inc., Holland, MI (US)

( * ) Notice: Subject to any disclaimer, the term of this patent is extended or adjusted under 35 U.S.C. 154(b) by 1128 days.

(21) Appl. No.: 12/127,254

(22) Filed: May 27, 2008

(65) Prior Publication Data

US 2008/0316953 A1 Dec. 25, 2008

Related U.S. Application Data

(60) Provisional application No. 60/944,961, filed on Jun. 19, 2007.

(51) Int. Cl.
*H04W 4/00* (2009.01)
*H04B 7/212* (2006.01)
*H04N 7/173* (2011.01)

(52) U.S. Cl. .................. 370/328; 370/329; 370/330

(58) Field of Classification Search ........... 370/328, 370/329, 330
See application file for complete search history.

(56) References Cited

U.S. PATENT DOCUMENTS

| | | | |
|---|---|---|---|
| 5,273,437 A | 12/1993 | Caldwell et al. | |
| 5,379,213 A | 1/1995 | Derks | |
| 5,528,621 A * | 6/1996 | Heiman et al. | 375/133 |
| RE35,449 E | 2/1997 | Derks | |
| 5,724,357 A * | 3/1998 | Derks | 370/313 |
| 6,021,119 A | 2/2000 | Derks et al. | |

(Continued)

FOREIGN PATENT DOCUMENTS

WO 95/34963 12/1995

OTHER PUBLICATIONS

Office Action for U.S. Patent Application Publication No. 2006/0072497 A1, published on Apr. 6, 2006, entitled Response System and Method With Dynamic Personality Assignment.

(Continued)

*Primary Examiner* — John Blanton
*Assistant Examiner* — Jay P Patel
(74) *Attorney, Agent, or Firm* — Gardner, Linn, Burkhart & Flory, LLP

(57) ABSTRACT

A wireless response system and method of retrieving user selections includes providing a plurality of response units, each having a wireless response transceiver and an input device and a plurality of base units, each having a wireless base transceiver. The wireless response transceiver is adapted to transmitting a response transmission in response to receipt of a base transmission. The base transceiver is adapted to transmitting base transmissions and receiving response transmissions from the response units. Each of the base units and each of the response units are assigned communication identification. Base transmissions include a unique base address of the base unit transmitting that base transmission. Response transmission includes the base address of the base transmission to which that response transmission is responding. Each of the base units processes response transmissions having its base address and does not process response transmissions not having its base address.

20 Claims, 6 Drawing Sheets

U.S. PATENT DOCUMENTS

| | | | |
|---|---|---|---|
| 6,070,084 | A | 5/2000 | Hamabe |
| 6,289,222 | B1 | 9/2001 | Cue et al. |
| 6,477,154 | B1 | 11/2002 | Cheong et al. |
| 6,577,611 | B1* | 6/2003 | Tat et al. ................ 370/330 |
| 6,591,103 | B1 | 7/2003 | Dunn et al. |
| 6,665,000 | B1 | 12/2003 | Buehler et al. |
| 6,807,266 | B2 | 10/2004 | Tripathi et al. |
| 6,895,213 | B1 | 5/2005 | Ward |
| 7,008,027 | B2 | 3/2006 | Kelley et al. |
| 7,035,275 | B2* | 4/2006 | Liang ..................... 370/436 |
| 7,149,183 | B2 | 12/2006 | Hammel et al. |
| 7,277,671 | B2 | 10/2007 | Glass et al. |
| 7,362,757 | B2 | 4/2008 | Griswold et al. |
| 7,433,348 | B1* | 10/2008 | Bordui et al. ............. 370/350 |
| 7,787,471 | B2* | 8/2010 | Baden et al. ............ 370/395.3 |
| 2002/0018489 | A1* | 2/2002 | Ambe et al. ............. 370/475 |
| 2002/0021701 | A1* | 2/2002 | Lavian et al. ............ 370/401 |
| 2002/0143415 | A1 | 10/2002 | Buehler et al. |
| 2003/0153321 | A1 | 8/2003 | Glass et al. |
| 2003/0153347 | A1 | 8/2003 | Glass et al. |
| 2003/0215780 | A1 | 11/2003 | Saar et al. |
| 2003/0236891 | A1 | 12/2003 | Glass et al. |
| 2004/0033478 | A1 | 2/2004 | Knowles et al. |
| 2004/0229642 | A1* | 11/2004 | Derks et al. ............. 455/524 |
| 2006/0072497 | A1* | 4/2006 | Buehler et al. ........... 370/328 |
| 2006/0114914 | A1* | 6/2006 | Anand et al. ........... 370/395.53 |
| 2006/0120389 | A1* | 6/2006 | Sampath et al. ......... 370/401 |
| 2006/0182118 | A1* | 8/2006 | Lam et al. ............ 370/395.42 |
| 2006/0209807 | A1* | 9/2006 | Lor et al. ................ 370/352 |
| 2006/0251085 | A1* | 11/2006 | Kalkunte et al. .......... 370/400 |
| 2007/0011040 | A1 | 1/2007 | Wright et al. |
| 2007/0042724 | A1 | 2/2007 | Derks |

OTHER PUBLICATIONS

Office Action for U.S. Patent Application Publication No. 2007/0042724 A1, published on Feb. 22, 2007, entitled Asynchronous Response System With Acknowledge.

International Search Report (Form PCT/ISA/210) and Written Opinion of the International Searching Authority (Form PCT/ISA/237) from corresponding Patent Cooperation Treaty Application No. PCT/US08/64959, mailed Jul. 28, 2008.

International Preliminary Report on Patentability (Form PCT/IB/373) from corresponding Patent Cooperation Treaty Application No. PCT/US08/64959, mailed Jan. 7, 2010.

* cited by examiner

- Definitions

B1 – BASE 1
  - 42 → Base ID (1-63): 1*
  - 44 → Base Address (1-15): 6

- 46 → R1 – BASE 1 RF Range

B2 – BASE 2
  - 42 → Base ID (1-63): 1*
  - 44 → Base Address (1-15): 7

- 46 → R2 – BASE 2 RF Range

KP – KEYPAD
  - 42 → Base ID (1-63): 1*

Fig. 3

AUDIENCE RESPONSE SYSTEM AND METHOD WITH MULTIPLE BASE UNIT CAPABILITY

CROSS REFERENCE TO RELATED APPLICATION

This application claims priority from U.S. provisional patent application Ser. No. 60/944,961, filed on Jun. 19, 2007, the disclosure of which is hereby incorporated herein by reference in its entirety.

BACKGROUND OF THE INVENTION

The present invention is directed to a wireless response system and method including providing wireless communication between a plurality of handheld response units, or keypads, and a base unit and in particular to such a system and method which allows each keypad to communicate with a plurality of base units.

Commonly assigned U.S. Pat. No. Re. 35,499 issued to Derks and entitled A REMOTE 2-WAY TRANSMISSION AUDIENCE POLLING AND RESPONSE SYSTEM and commonly assigned U.S. Pat. No. 5,724,357 issued to Derks and entitled REMOTE RESPONSE SYSTEM AND DATA TRANSFER PROTOCOL each disclose a communication protocol for wireless communication between a base unit and a plurality of response units in order to collect responses entered by users at the response units. In order to ensure reliable receipt of the responses, the base unit examines the data received from the response units for validity and sends an acknowledge message to the response unit sending that data.

In order to increase the geographic size of the system, such as to encompass a large space such as an auditorium, stadium, or the like, response systems have been proposed that utilize a plurality of base units, each capable of receiving data from the response units. One such system disclosed in commonly assigned United States Patent Application Publication No. US 2003/0236891 A1 entitled WIRELESS ASYNCHRONOUS RESPONSE SYSTEM includes a plurality of base units in a large facility, each of which is capable of receiving a wireless signal from any of a large number of response systems. However, the system disclosed therein is an asynchronous system in which data is sent from the response unit to one of the base units without receiving a base transmission from the base unit. Such system has limitations that are not found in a response system in which data is sent from the response units to a base unit in response to a base transmission from the base unit.

In another system disclosed in commonly assigned United States Patent Application Publication No. US 2003/0153321 A1 entitled WIRELESS RESPONSE SYSTEM AND METHOD, a plurality of base units are synchronized such as by a cable or other communication channel between the base units. This allows synchronized base transmissions so that one base unit is not sending a base transmission while the other base unit is listening to receive data from the response units. However, this requires coordination between the base units.

SUMMARY OF THE INVENTION

The present invention provides a wireless response system and wireless method of retrieving user selections including providing a plurality of response units that are capable of communication with a plurality of base units that may be spread out in a large space, such as an auditorium, stadium, or the like, that does not have the limitations of prior systems.

A wireless response system and method of retrieving user selections according to an aspect of the invention includes providing a plurality of response units, each having a wireless response transceiver and an input device and providing a plurality of base units, each having a wireless base transceiver. The wireless response transceiver receives a base transmission and transmits a response transmission in response to receipt of a base transmission. The base transceiver transmits base transmissions and receives response transmissions from the response units. Each of the base units and each of the response units is assigned a communication identification. A response unit exchanges wireless communication transmissions with a base unit having a common communication identification with that response unit. Each of the base units is also assigned a base address. The base transmission includes the base address of the base unit transmitting that base transmission. The response transmission includes the base address of the base transmission to which that response transmission is responding. The base units process response transmissions having a base address in common with the base address with that base unit and do not process response transmissions having a base address in common with the base address of that base unit.

Each of the response units may process a response transmission by determining if that response transmission is valid and including an acknowledgement with a subsequent base transmission in response to receipt of a valid response transmission. Each of the response units may process the acknowledgement when the acknowledgement is transmitted along with the same base address as the base address causing that response unit to transmit a response transmission.

The communication identification may be a communication frequency, a frequency hopping sequence, or the like. The system may include a plurality of base units all having a common communication identification.

The response units may transmit response transmissions in particular time slots according to a time division multiplexing protocol. One or more of the base units may assign either a time slot or a communication identification to response units sending a request for same. The base units may assign sequential time slots to response units in the order in which the response units send such a request. The base unit(s) assigning time slots and/or communication identifications may transmit base transmissions at a power level that is lower than that of any other base units.

These and other objects, advantages and features of this invention will become apparent upon review of the following specification in conjunction with the drawings.

BRIEF DESCRIPTION OF THE DRAWINGS

FIG. 3 is a key to the items in FIG. 2;

DESCRIPTION OF THE PREFERRED EMBODIMENT

Figure 1:
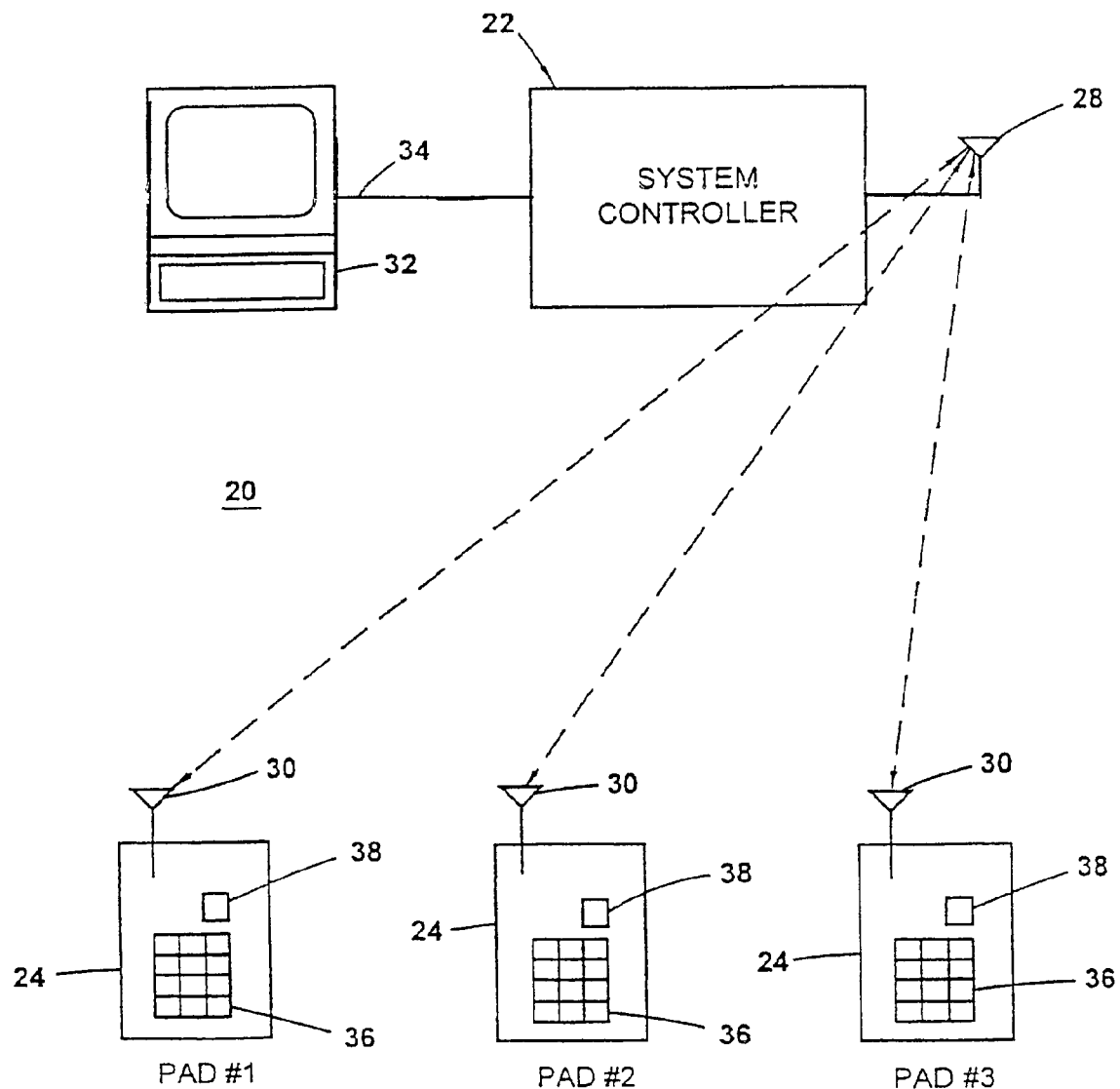
FIG. 1 is a block diagram illustrating a portion of a wireless response system, according to the invention.

Referring now specifically to the drawings, and the illustrative embodiments depicted therein, a wireless response system 20 includes a plurality of response units 24, each having a wireless transceiver 30 and an input device, illustrated as a keypad 36, that is adapted to receiving a user input selection (FIG. 1). Each response unit 24 may include a display 38 for providing information to the user, such as communicated from base 22 to the corresponding response unit 24. Response system 20 additionally includes a plurality of base units, or system controllers, 22, only one of which is illustrated in FIG. 1. Each base unit 22 includes a wireless transceiver 28 that is capable of communicating with one or more response units 24. Base unit 22 is interconnected with a computer 32 over an interface 34. Interface 34, in the illustrative embodiment may be a serial or parallel interface, of the type that is known in the art, such as a USB serial interface and Ethernet interface, or the like. In the illustrative embodiment, the communication method determined between base unit 22 and computer 32 depends upon the type of cable that is inserted into the base unit 22 when it receives electrical power. More than one interface can be interconnected simultaneously, but only the first connected to an unpowered base unit establishes the communication method. Interface 34 may be wired or wireless.

In the illustrative embodiment, base units 22 and response units 24 may be provided according to the principles set forth in commonly assigned U.S. Pat. Nos. Re. 35,449; 5,724,357; 6,021,119; and 6,665,000; and United States Patent Application Publication Nos. 2003/0153347 A1; 2003/0153321 A1; 2003/0153263 A1; 2003/0236891 A1; 2004/0229642 A1; 2006/0072497 A1; and 2007/0042724 A1, the disclosures of which are hereby collectively incorporated herein by reference in their entireties. In the illustrated embodiments, communication between base units 22 and response units 24 may be synchronous under the control of the respective base unit. However, under certain applications, this communication may be asynchronous, in which the transfer of user responses from the response unit to the base unit is initiated by the respective response unit.

Figure 2:
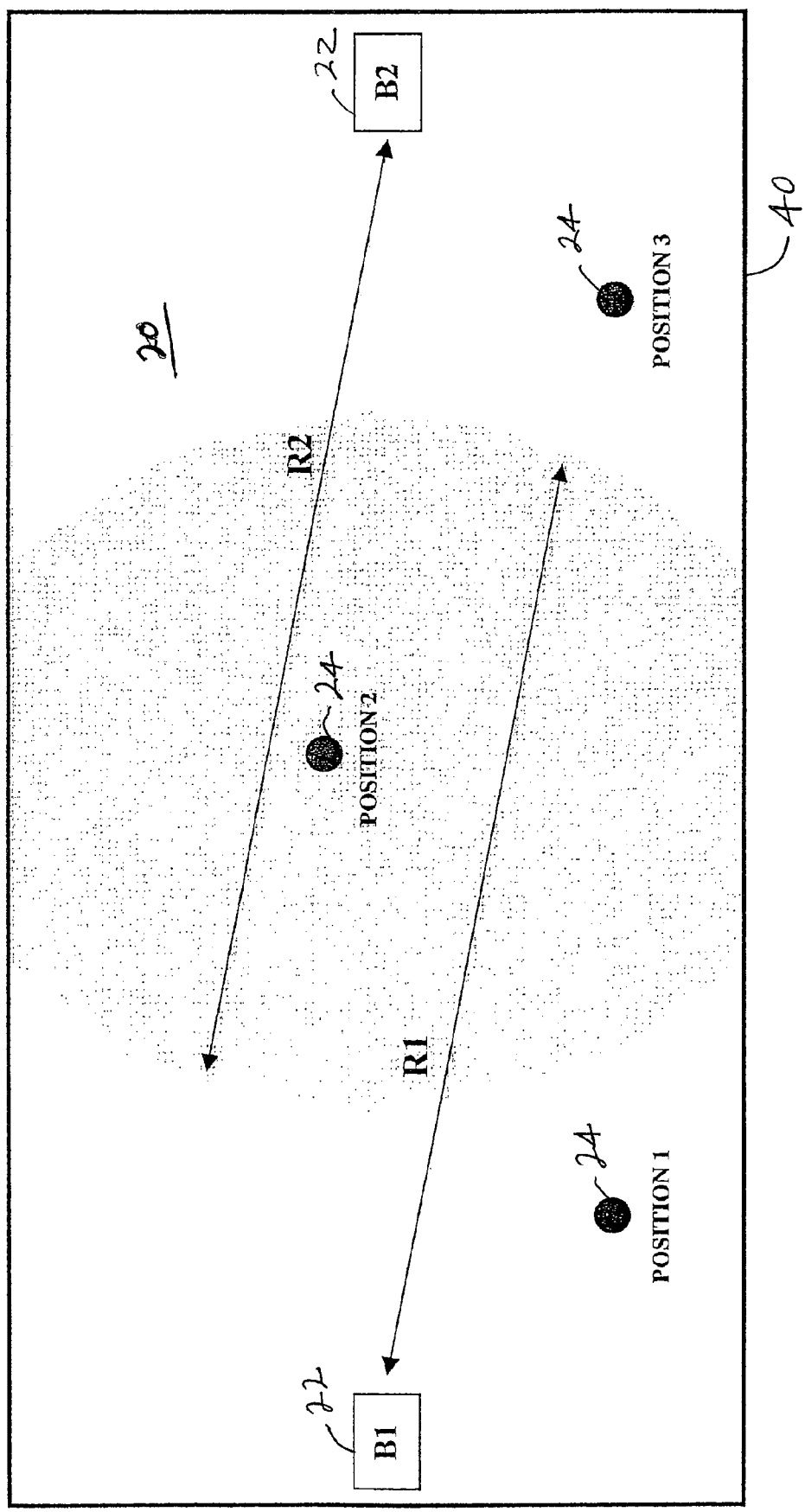
FIG. 2 is a plan view illustrating an exemplary layout of a wireless response system in a large space, such as an auditorium.

In wireless response system 20, the plurality of base units 22 may be geographically distributed within a space 40 (FIG. 2). Space 40 may be, by way of example but not limitation, a large conference room, an auditorium, a stadium, an arena, or the like. For simplicity, system 20 is illustrated in FIG. 2 with two base units 22, which are labeled B1 and B2. However, system 20 advantageously may incorporate a greater number of base units 22. As will be described in more detail below, as a response unit 24 is carried within space 40 by its user, the response unit may communicate with base B1, such as when the response unit is in position 1, with base unit B2, such as when the response unit is in position 3, or either base unit B1 or B2, such as when the response unit is in position 2.

Each base unit transmits base transmissions which are received by a response unit 24 within the range R1 or R2 of the respective base unit. The base transmission may include a sync byte to coordinate responses of a plurality of the response units and a plurality of characters that pertain to particular remote response units as disclosed in commonly assigned U.S. Pat. No. 5,724,357 entitled REMOTE RESPONSE SYSTEM AND DATA TRANSFER PROTOCOL, the disclosure of which is hereby incorporated herein by reference. With such protocol, the response units include a personality, such as a time slot assigned to that response unit. The response unit sends a response transmission measured from the sync byte sent in the base transmission in its time slot. The time slot assignment or personality may be assigned by the base unit during a join mode as disclosed in United States Patent Application Publication No. 2006/0072497 entitled a RESPONSE SYSTEM AND METHOD WITH DYNAMIC PERSONALITY ASSIGNMENT, the disclosure of which is hereby incorporated herein by reference. In such a system, the response unit sends to the base unit a request to be added to the system. The join mode may be mutually exclusive with a normal polling mode in which user entered responses are sent to the base unit. During the join mode, the user presses a button on the response unit, which, when pressed in the proximity of a base unit, will initiate a communication with the base unit for a personality assignment. The base unit will issue a personality to the corresponding response unit.

In the illustrated embodiment, the joining is accomplished through a much attenuated RF communication channel with the base unit. Therefore, the response unit must be in very close proximity to the joining base unit. In the illustrated embodiment, the base unit will issue addresses sequentially as they are requested up to a limit of available addresses. The response unit not having a personality assigned is referred to as neutralized. A response unit that has been assigned a personality can be neutralized during normal polling from a command from the base unit or with a manual power-down of the response unit. Pressing of a personality requesting key on a neutralized response unit will light a display on the response unit until a personality has been assigned. Once the response unit receives a personality, pressing this button again immediately will not affect the newly assigned personality. However, once a re-joined timeout period has passed, the response unit will be able to obtain a new personality from the base unit. The response unit is capable of retaining its personality during a sleep mode. However, if the response unit loses power, through an intentional power-down or by the replacement of batteries, the response unit will lose its personality and a new personality can be obtained during the join mode. The response unit also includes a timeout period. Once the unit is in a sleep mode beyond the timeout period, the new personality will be deleted.

The response unit also includes a normal polling mode. This mode is used for collecting user inputs. The responses may be time-stamped, as disclosed in commonly assigned United States Patent Application Publication No. US 2003/0153263 A1, entitled WIRELESS SYSTEM AND METHOD, the disclosure of which is hereby incorporated herein by reference. In addition to response units which have a dynamically maintainable personality, certain of the response units may be static response units in which the personality is not assignable by the base unit.

Each base unit 22 operates with a base identification, or base ID, 42 and has assigned to that base unit a base address 44 (FIG. 3). Each base unit operates within, a range 46 which is the envelope around the respective base unit where a response unit must be located in order to communicate with that base unit. Base ID 42 may, for example, be a particular frequency band in which the base transceiver 28 is tuned in order to transmit and receive data. Alternatively, the base ID 42 may be a frequency hopping sequence that facilitates communication according to a spread spectrum protocol with one or more of the response units. Other examples of a base ID may be apparent to the skilled artisan. In the illustrative embodiment, each base unit is capable of assuming up to 63 unique base ID parameters. However, a greater or lesser number of base IDs may be utilized. Each response unit 24 is also assigned a base ID 42, as illustrated in FIG. 3. When a response unit and a base unit are assigned the same base ID, they are capable of communicating with each other. When a response unit and a base unit are assigned different base IDs, they are not capable of communicating with each other. In the embodiment illustrated in FIGS. 2 and 3, both base units B1 and B2 are set to base ID 1 and the response unit is set to the same base ID 1. Therefore, the response unit as seen in FIG. 2 is capable of communicating with either base unit B1 or B2 provided that the response unit is within the range of the respective base unit.

Therefore, as seen in FIG. 2, a response unit in position 1 is only capable of communicating with base unit B1 because it is within the range R1 of base unit B1 but is not within range R2 of base unit B2 because it is outside of range R2. When the response unit 24 is in position 3, it is capable of communicating with base unit B2 because it is within range R2 but is not capable of communicating with unit B1 because it is not within range R1. However, when a response unit is in position 2, it is within range R1 of base unit B1 and range R2 of base unit B2. Because the response unit and base units B1 and B2 are all set to the same base ID, response unit 24 and position 2 is theoretically capable of communicating with base units B1 and B2.

As previously set forth, each base unit 22 is assigned a base address 44. In the illustrative embodiment, each base address may be selected from one of 16 values but other numbers of values may be used. In the embodiment illustrated in FIG. 3, base unit B1 is assigned base address 6 and base unit B2 is assigned base address 7. When a base unit transmits a base transmission, the base transmission includes the base address 44 for that base unit. When a response unit receives a base transmission, the response unit reads the base address contained within that base transmission and includes that base address with its reply to the base unit.

As disclosed in commonly assigned U.S. Pat. Nos. Re. 35,449 and 5,724,357, the base unit examines the response transmission received from a response unit in order to determine if the received data is valid. If the received data is valid, the base unit sends an acknowledge message to the response unit sending the valid data in the next base transmission sent by that base unit. In the illustrated embodiment, once a response unit sends a response unit transmission in response to a base transmission, and including the base address of that base unit, the response unit will only accept an acknowledge message including that same base address. Thus, a response unit locks on to a base unit base address until it has received an acknowledge message from that base unit. However, once this occurs, the response unit is able to receive a subsequent base transmission from a different base unit and respond to that base transmission in the same fashion described above.

Figure 4:
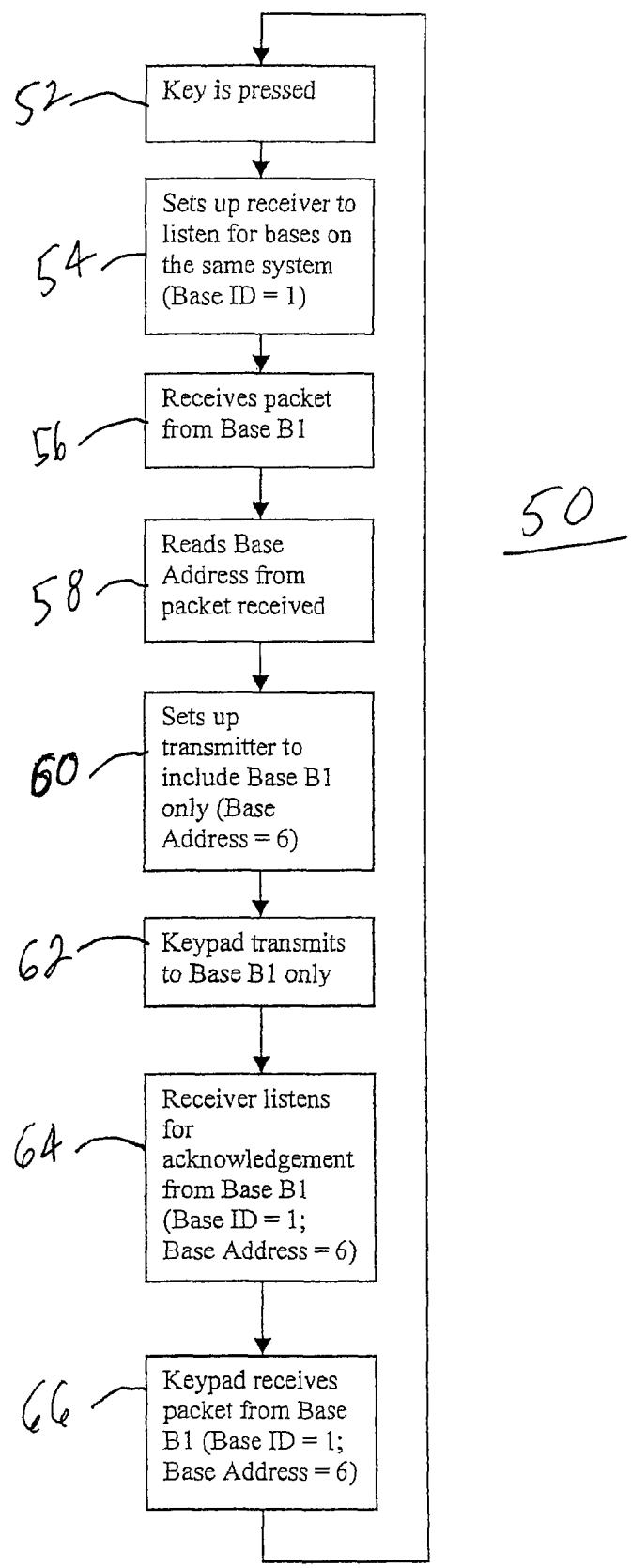
FIG. 4 is a flowchart illustrating communication between a response unit in position 1 and base unit B1.
Figure 5:
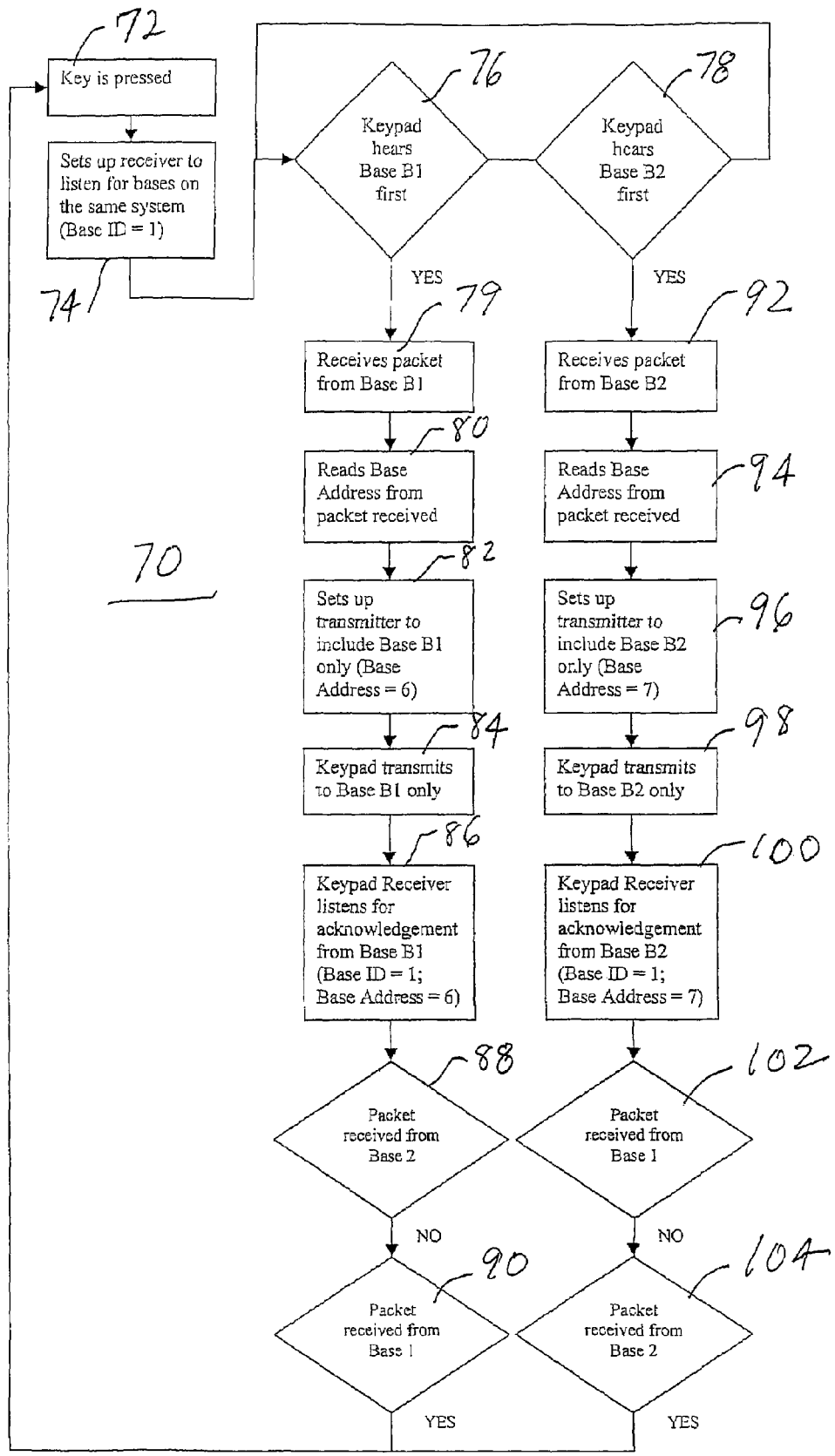
FIG. 5 is a flowchart illustrating communication between a response unit in position 2 in FIG. 2 and base units B1 and B2.
Figure 6:
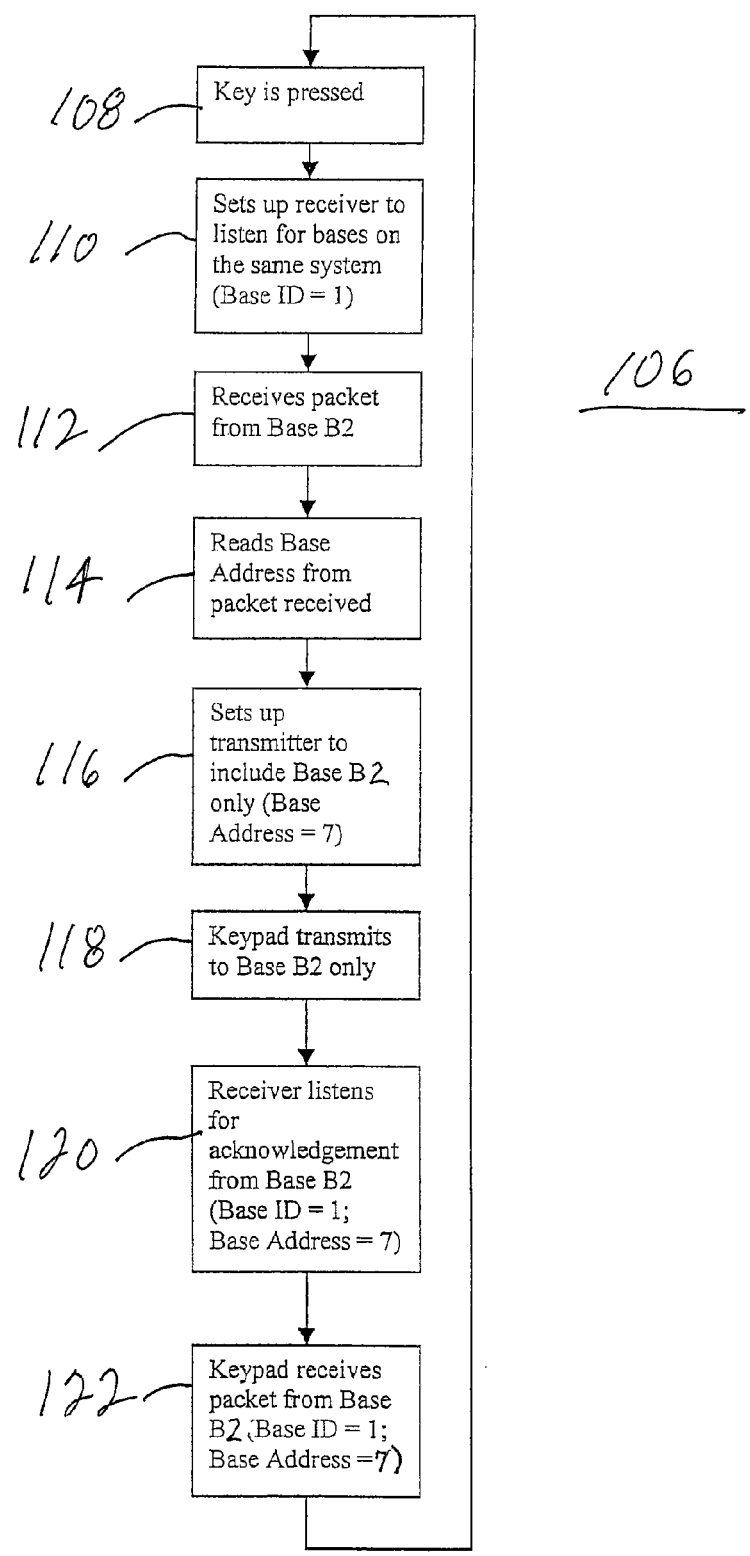
FIG. 6 is a flowchart of a response unit in position 3 in FIG. 2 illustrating communication between the response unit and base unit B2.

Operation of wireless response system 20 is illustrated in FIGS. 4-6. Although illustrated as three separate processes depending upon the location of response unit 24, it should be understood that these are all facets of the same process but resulting in different outcomes. A process 50 is carried out by response unit 24 when in position 1 in FIG. 2. When a user enters a user response at 52, the response unit sets up its transceiver to listen for a base transmission on the base ID assigned to that response unit (54). The response unit receives the base transmission from base B1 at 56 because the response unit is within range R1 of that base unit. The response unit reads at 44 the base address from the base transmission received at 58. The response unit then constructs a response unit transmission at 60 with a base address 6, which is the base address assigned to base unit B1 in the example, to be included with the response unit transmission. Because the response unit is only within range R1 of base unit B1, the response unit only is capable of transmitting to base unit B1 (62). Once the response unit has sent its response unit transmission at 62, the response unit listens (64) for an acknowledgement from base B1 having the same base address 6. Because the base address 6 matches the base address received by that response unit in the prior base unit transmission, and used by that response unit in its response unit transmission, the response unit processes that acknowledgement at 66 and changes from a ready-to-transmit mode to a mode in which it is not ready to transmit. The process then returns to wait at 52 for the user to enter a new user input and repeats itself.

If the response unit is at position 2 in FIG. 2, it is capable of communicating with either base unit B1 or base unit B2 because it is within range R1 of base unit B1 and range R2 of base unit B2. A process 70 begins when the user enters a user input at 72. The response unit then attempts at 74 to receive any base transmissions on its base ID which, in the illustrative embodiment, is base ID 1. Because the response unit at position 2 can receive a base transmission from either base unit B1 or base unit B2, it checks to determine if it is receiving a base transmission from base unit B1 at 76. If it does not receive a base transmission from base unit B1, it checks to determine if it is receiving a base transmission from base unit B2 (78). It should be understood that the system is not limited to two base units on the same base ID. Indeed, the number of bases is limited only by the number of base addresses that are possible within the system. If the response unit does not receive a transmission from either base unit B1 or base unit B2, it continues to cycle (76, 78) until a base transmission is received.

If the response unit receives a base transmission from base B1 at 76, it examines the base transmission at 79 and reads at 80 the base address within that base transmission. The transceiver 30 for that response unit is locked onto base B1 at 82 and sends a response unit transmission including a base address equal to 6 at 84. The response unit then attempts to receive at 86 a subsequent base transmission having the base address equal to 6 and does not process any base transmissions that do not have base address 6. If the response unit receives a base transmission from base B2 at 88, the base transmission is not processed and it is determined at 88 whether the received base transmission is not from base unit B2. It is then determined at 90 that the decoded base transmission includes the base address from base unit B1 and processes the base transmission from base unit B1. The process returns to 72 to await a further input from the user.

If the response unit has received a base transmission from base unit B2 at 78, the base transmission is decoded at 92 and the base address for the base transmission is determined at 94. The response unit locks at 96 onto base address 7 and transmits at 98 a response unit transmission containing the base address 7 for base unit B2. Once locked onto base unit B2, the response unit attempts to receive at 100 the next base transmission from base unit B2 and ignores any transmission from base unit B1 at 102. When the response unit receives a base transmission from base unit B2 at 104, the process returns to 72 to await the next user input selection.

If the user transports the response unit 24 to position 3, as seen in FIG. 2, the response unit is only within the range R2 of base unit B2. Accordingly, a process 106 is carried out. When a user enters a user input at 108, the transceiver of that response unit attempts to receive base transmissions at 110 on the base ID to which that response unit is set. The response then receives at 112 a base transmission from base B2 and decodes the base transmission. The response unit then examines at 114 the base address from the received packet and determines at 116 that the base address equals 7 which is the base address base unit B2. The response unit then locks onto base unit B2 and transmits a response unit transmission at 118 including that the base address equals 7 which is the base address for base unit B2. The response unit then attempts to receive the next base transmission at 120 and only processes that base transmission if it includes that the base address equals 7 which is the base address for base unit B2. The response unit then processes the base transmission at 122 from base unit B2.

It bears repeating that, although illustrated as three separate processes, the manner in which a response unit attempts to communicate with base unit B1 or base unit B2 is the same irrespective of the position of the response unit. These are illustrated separately because, in the case of positions 1 and 3, the response unit is only capable of receiving a base transmission from one of the base units whereas in position 2, the response unit is capable of receiving base transmissions from either base unit B1 or base unit B2. It should also be understood that the limited number of base units in the illustrated example is for ease of explanation and that more than two base units may share a common base ID and that multiple different base IDs can be in use in a particular application. In the illustrated embodiment, up to 500 response units can be processed on each base ID, although the actual number of response units is based upon the application.

Thus, it is seen that the wireless response system disclosed herein is capable of utilizing multiple base units having the same base ID without the necessity of coordinating the activities of the base units. Because a base unit processes response unit transmissions only from response units returning the base address of that base unit, it is ensured that the response unit is responding in an appropriate time slot as mutually recognized by the base unit and the response unit. Moreover, it ensures that each "vote" from the response unit is processed by one and only one base unit, thereby avoiding multiple counting of a single vote. Moreover, because the response unit locks on to the base unit whose base transmission causes that response unit at that time to send a response transmission, the response unit will only process an acknowledge from the base unit to which it is locked on.

Thus, it is seen that the wireless response system disclosed herein allows a large number of response units to operate concurrently in a large space, each capable of communicating with multiple base units. Thus, each user can roam around the space and be in constant contact with at least one base unit that is capable with communicating with that response unit. There is no necessity to avoid overlap between the ranges of the base units operating on the same base ID because the wireless response system is able to avoid conflicts that may be created by a response unit attempting to communicate with more than one base unit at a time.

Changes and modifications in the specifically described embodiments can be carried out without departing from the principles of the invention which is intended to be limited only by the scope of the appended claims, as interpreted according to the principles of patent law including the doctrine of equivalents.

We claim:

1. A wireless response system, comprising:
   a plurality of response units, each having a wireless response transceiver and an input device, said input device adapted to receiving a user input selection, said wireless response transceiver adapted to receive a base transmission and to transmit a response transmission in response to receipt of a base transmission;
   a plurality of base units, each having a wireless base transceiver, said base transceiver adapted to transmit base transmissions and receive the response transmissions from said response units;
   wherein each of said base units and each of said response units adapted to be assigned a communication identification, wherein each of said response units is adapted to exchanging wireless transmissions with one of said base units having a common communication identification with that one of said response units;
   wherein each of said base units is adapted to be assigned a base address that is different from the base addresses of the other of said base units, wherein the base transmissions include the base address of the one of said base units transmitting that base transmission and wherein each of the response transmissions includes the base address of the base transmission to which that response transmission is responding;
   wherein each of said base units is adapted to process the response transmissions having a base address in common with the base address of that base unit and not process response transmissions not having a base address in common with the base address of that base unit; and
   wherein at least some of said plurality of base units and some of said plurality of response units are assigned a common communication identification, wherein each of said response units having the common communication identification responds to the first of the base transmissions received from one of said at least some of said plurality of base units and only responds to a subsequent base transmission having the same base address as the base address of the first of the base transmissions received, wherein a response unit will temporarily lock on to one of the base units until it has received a subsequent base transmission from that one of the base units.

2. The wireless response system as claimed in claim 1 wherein each of said base units being adapted to process one of the response transmissions having a base address in common with the base address of that base unit to determine if that one of the response transmissions is valid and includes an acknowledgement with a subsequent one of the base transmissions in response to receipt of a valid one of the response transmissions.

3. The wireless response system as claimed in claim 2 wherein each of said response units is adapted to process the acknowledgement received with the subsequent base transmission when the acknowledgement is transmitted along with the same base address as the base address causing that response unit to transmit the one of the response transmissions, wherein the response unit will temporarily lock on to the one of the base units it has received the acknowledgement.

4. The wireless response system as claimed in claim 1 wherein said communication identification comprises a communication frequency.

5. The wireless response system as claimed in claim 1 wherein said communication identification comprises a frequency hopping sequence.

6. The wireless response system as claimed in claim 1 wherein said response units transmit the response transmissions in particular time slots according to a time division multiplexing protocol.

7. The wireless response system as claimed in claim 6 wherein at least one of said base units is adapted to assigning at least one chosen from a time slot and a communication identification to ones of said response units sending a request.

8. The wireless response system as claimed in claim 7 wherein said at least one of said base units is adapted to assigning sequential time slots to said response units in order in which said response units send a request.

9. The wireless response system as claimed in claim 7 wherein said at least one of said base units is adapted to transmit base transmissions at a power level that is lower than that of other of said base units.

10. The wireless response system as claimed in claim 1 wherein the base transmissions of said at least some of said base units are not coordinated among said at least some of said base units.

11. A wireless method of retrieving user selections with a plurality of response units and a plurality of base units, each of the response units having a wireless response transceiver and an input device, each of the base units having a wireless base transceiver, said method comprising:
transmitting base transmissions with said base transceivers;
receiving user selections with said user input devices;
transmitting a response transmission with one of said wireless response transceiver in response to receipt of one of the base transmissions;
receiving the response transmissions from said response units with said base transceivers of said base units;
assigning each of said base units and each of said response units a communication identification;
said transmitting and said receiving including exchanging wireless transmissions between one of the response units and one of said base units having a common communication identification with that one of said response units;
assigning each of said base units a base address that is different from the base addresses of the other of said base units and including the assigned base address with the base transmissions of the one of said base units transmitting those base transmissions;
including with each of the response transmissions the base address of the one of the base transmissions to which that one of the response transmissions is responding;
processing with each of said base units the response transmissions having a base address in common with the base address of that one of said base units and not processing with each of said base units the response transmissions not having a base address in common with the base address of that one of said base units;
assigning a common communication address to at least some of said plurality of base units and at least some of said plurality of response units; and
each of said response units having the common communication identification responding to the first of the base transmissions received from one of said at least some of said plurality of base units and only responding to a subsequent base transmission having the same base address as the base address of the first of the base transmissions received, wherein the response unit will temporarily lock on to the one of the base units until it has received a subsequent base transmission from that one of the base units.

12. The wireless method as claimed in claim 11 wherein said processing includes processing one of the response transmissions having a base address in common with the base address of that base unit to determine if that one of the response transmissions is valid and including an acknowledgement with a subsequent one of the base transmissions in response to receipt of a valid one of the response transmissions.

13. The wireless method as claimed in claim 12 including processing the acknowledgement with the one of said response units receiving that subsequent one of the base transmissions when that acknowledgement is received with the subsequent one of the base transmissions along with the same base address as the base address that was included with the response transmission sent by that one of said response units, wherein the response unit will temporarily lock on to one of the base units until it has received the acknowledgement from that one of said base units.

14. The wireless method as claimed in claim 11 wherein said communication identification comprises a communication frequency.

15. The wireless method as claimed in claim 11 wherein said communication identification comprises a frequency hopping sequence.

16. The wireless method as claimed in claim 11 including transmitting said response transmissions according to a time division multiplexing protocol.

17. The wireless method as claimed in claim 16 including assigning at least one chosen from a time slot and a communication identification for communication with at least one of said base units to ones of said response units sending a request.

18. The wireless method as claimed in claim 17 wherein said assigning a time slot includes assigning sequential time slots to said response units in order in which said response units send a request.

19. The wireless method as claimed in claim 17 wherein said assigning a time slot includes transmitting said base transmission at a power level that is lower than when not assigning a time slot.

20. The wireless method as claimed in claim 11 wherein the base transmissions of said at least some of said base units are not coordinated among said at least some of said base units.

* * * * *